United States Patent [19]

Williams et al.

[11] Patent Number: 5,255,617

[45] Date of Patent: Oct. 26, 1993

[54] RIDGE PREPARATION TOOL FOR SEED PLANTING EQUIPMENT

[75] Inventors: Robert A. Williams; Patrick G. Lohmeier, both of Garden City, Kans.

[73] Assignee: Acra-Plant, Inc., Garden City, Kans.

[21] Appl. No.: 837,032

[22] Filed: Feb. 14, 1992

[51] Int. Cl.$^5$ .................... A01C 5/06; A01B 5/04
[52] U.S. Cl. .................... 111/140; 111/157; 111/169; 172/166; 172/540; 172/603; 172/740; 172/744
[58] Field of Search ............... 111/139, 140, 141, 142, 111/149, 157, 163, 168, 169; 172/165, 166, 174, 175, 177, 180, 181, 195, 540, 603, 739, 740, 744

[56] References Cited

U.S. PATENT DOCUMENTS

| | | | |
|---|---|---|---|
| 708,265 | 9/1902 | Shuping et al. | 172/603 X |
| 1,155,349 | 10/1915 | Geisler | 172/603 |
| 1,417,207 | 5/1922 | Schutt | 172/603 |
| 2,757,593 | 8/1956 | Bowman | 172/603 |
| 3,718,191 | 2/1973 | Williams | 172/603 X |
| 4,295,532 | 10/1981 | Williams et al. | 111/139 X |
| 4,425,973 | 1/1984 | Williams et al. | 172/744 X |
| 4,483,401 | 11/1984 | Robertson | 172/744 X |
| 4,779,684 | 10/1988 | Schultz | 172/740 X |

*Primary Examiner*—Dennis L. Taylor
*Assistant Examiner*—Spencer Warnick
*Attorney, Agent, or Firm*—Hovey, Williams, Timmons & Collins

[57] ABSTRACT

The ridge preparation tool is adapted to be attached to a seed planter directly ahead of the trench-forming structure of the planter so as to skim off the crest of the ridge for the production of a clean, relatively narrow strip of prepared soil in which the trench-forming structure can operate effectively. The free-wheeling skimming disc of the tool is held at an oblique angle to the centerline of the planter and may be adjusted to increase or decrease the extent of side throw of the skimmed off materials by selectively raising or lowering an outwardly bent mounting arm that holds disc at its oblique angle. Raising or lowering the angled mounting arm causes the disc to cock inwardly or outwardly while maintaining the same oblique angle. The throw-adjusted disc can be returned to the same skimming depth by appropriate manipulation of a vertical adjustment unit associated with the tool.

11 Claims, 3 Drawing Sheets

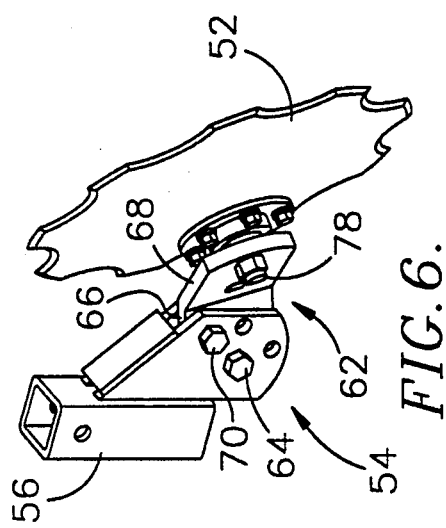
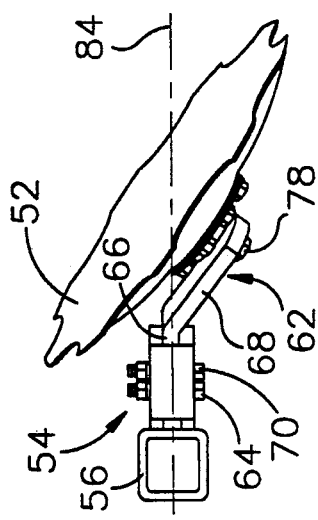
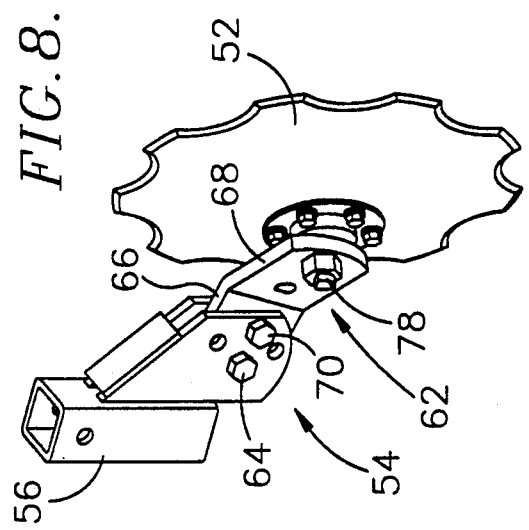
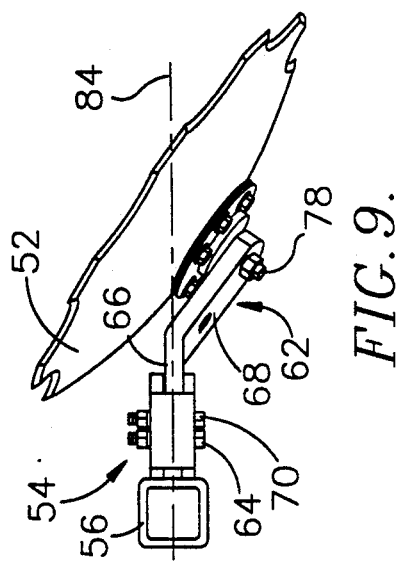
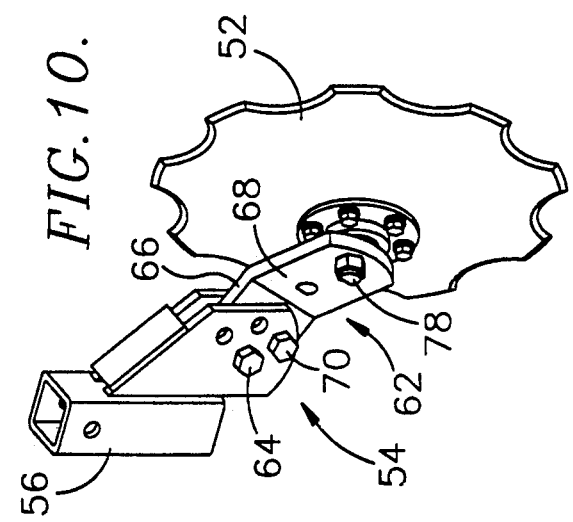
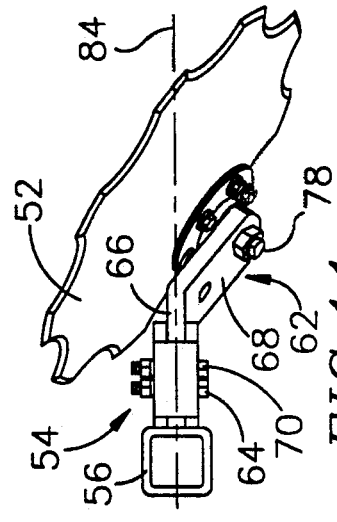

RIDGE PREPARATION TOOL FOR SEED PLANTING EQUIPMENT

TECHNICAL FIELD

This invention relates to ridge planting equipment and, more particularly, to an attachment to conventional planters for skimming off the crest of the ridge in advance of the seed trench forming structure of the planter so that such structure has a clean, trash-free strip of soil in which to make the trench-shaped seed bed.

BACKGROUND

The concept of planting new seed rows on the same ridges used during the previous crop season is steadily growing in popularity for a number of good reasons. While it is important in carrying out such ridge planting techniques that the stubble and trash residue from last season's crop be skimmed off the crest of the ridge in order to leave a narrow band or strip of clean soil in which the seed receiving trench can be formed, it is also important to be able to carefully control the disposition of the crop roots, soil and other materials as they are skimmed off the crest while the planter moves along. In some cases the farmer may want to keep the skimmed off materials as close as possible to the newly planted seed row, while at other times he may want to deposit the residue further away from the row. Depending upon the circumstances, he may wish to be able to vary this extent of lateral throw and yet maintain the same skimming depth so that the seed bed is likewise maintained at a constant depth.

SUMMARY OF THE PRESENT INVENTION

Accordingly, one important object of the present invention is to provide a ridge preparation tool of the aforementioned type which permits the farmer to quickly and easily adjust the distance the skimmed off materials are thrown to one side of the ridge as the planter moves along the ridge line during planting operations.

Another important object is to provide a way for the farmer to adjust the side throw without necessitating a change in the oblique angle at which the rotary skimming member moves along the ridge line.

A further important object of the invention is to provide a relatively simple, effective and rugged mounting arrangement for the skimming member which permits the desired side throw adjustment without complicated or expensive mechanism.

A still further important object of the present invention is to provide a ridge preparation tool which can be mounted on the same supporting bracket used by a currently commercially available trash clearing attachment so that, depending upon the specific job to be accomplished, the farmer can readily interchange the ridge preparation tool of the present invention and the trash clearing attachment of the prior art with only a minimum of down time. In this respect, it is also an important object of the present invention to take advantage of the vertical depth adjustment means existing in current trash clearing attachments and adapt the tool of the present invention to simply connect directly to such existing depth adjustment so that any depth changes which might otherwise be produced by changing the extent of throw of the skimming member can be concurrently offset by appropriately manipulating the depth adjustment mechanism on the basic mounting platform.

In carrying out the foregoing and other objects, the present invention is based upon the discovery that the side throw of a rotary skimming member can be increased or decreased by merely changing the angle of incline or lean of the member relative to the centerline of the planter while the member is maintained in the same oblique orientation with respect to such centerline or path of travel. Instead of swiveling the member about an upright axis to change its obliqueness, which would change the throw distance but would also complicate the mechanism, the member is simply mounted in such a way that the lean in or lean out of the member is changed while it stays in its same oblique attitude with respect to the path of travel of the planter. Furthermore, while such adjustment of the lean angle could be made by rotating the member about a horizontal swivel having its axis parallel to the oblique plane of the member, such a mechanism would also unduly complicate the overall construction of the device and might not provide the desired degree of reliability and ruggedness.

The simple approach which has now been discovered is to mount the skimming member on a vertically swingable arm that has a dogleg bend along its length so that the skimming member is mounted on the front face of the outturned portion of the arm which is disposed at the same oblique angle as the member itself. Thus, when the arm is pivoted upwardly or downwardly during adjusting movement, the outturned portion in effect revolves around the pivot axis in a conical path of travel, causing the member to lean or lean out depending upon the position of the outturned portion upon its conical path. Although raising or lowering the support arm correspondingly raises or lowers the skimming member, the vertical depth adjustment mechanism also associated with the assembly allows for such height change to be correspondingly compensated for, thereby enabling the farmer to reestablish the same skimming depth notwithstanding a change in the lean angle of the member. A transverse locking pin may be quickly inserted into a selected adjustment hole in the mounting arm to retain the arm at a selected vertically swung position.

BRIEF DESCRIPTION OF THE DRAWINGS

FIG. 6 is a right front perspective view of the tool showing the mounting arm in its upper position with the skimming disc leaned back in toward the centerline of the planter to its maximum extent for maximum throw;

FIG. 7 is a top plan view of the tool in the maximum throw position of FIG. 6;

FIG. 8 is a right front perspective view of the tool with the skimming disc in an intermediate position in its most nearly upright attitude for moderate side throw;

FIG. 9 is a top plan view of the tool in the moderate throw position of FIG. 8;

FIG. 10 is a right front perspective view of the tool with the skimming disc leaning outwardly away from the centerline to its maximum extent for minimum throw of the skimmed materials;

FIG. 11 is a top plan view of the tool in the minimum throw position of FIG. 10;

DETAILED DESCRIPTION

Figure 1:
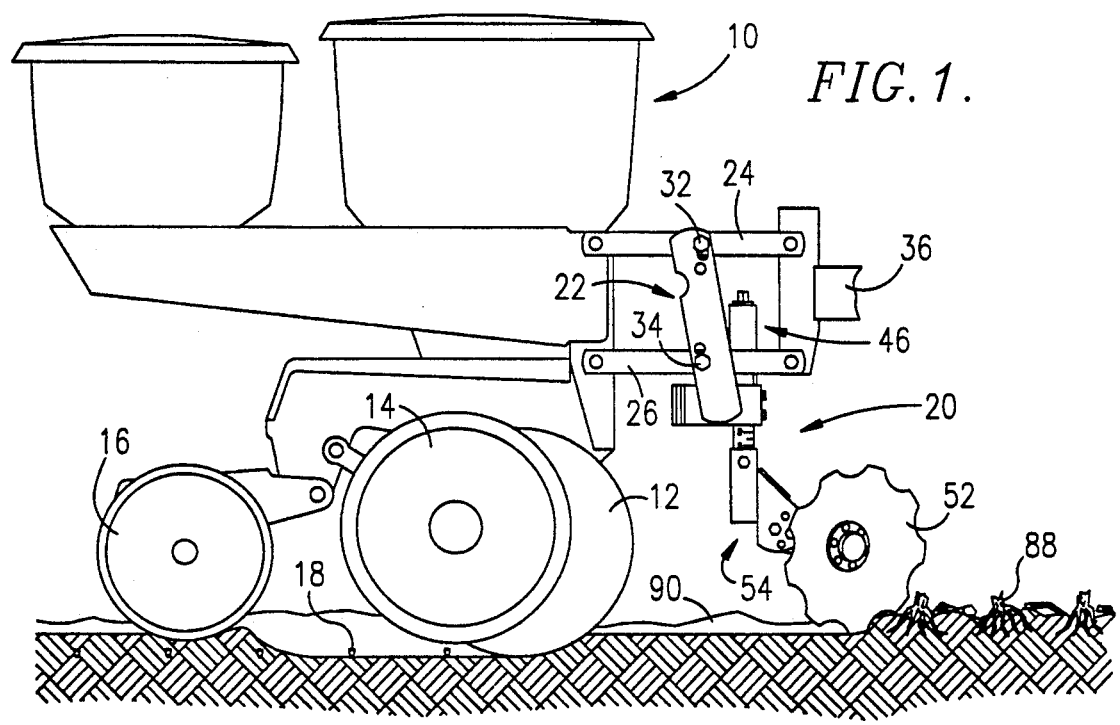
FIG. 1 is a schematic side elevational view of a typical seed planter utilizing a ridge preparation tool in accordance with the principles of the present invention.

The planter 10 selected for illustration has seed trench forming structure in the nature of at least one slicing disc 12 whose depth is controlled by a closely adjacent depth gauging wheel 14. A trailing press wheel 16 covers up deposited seeds 18 with soil to complete the planting process.

Figure 2:
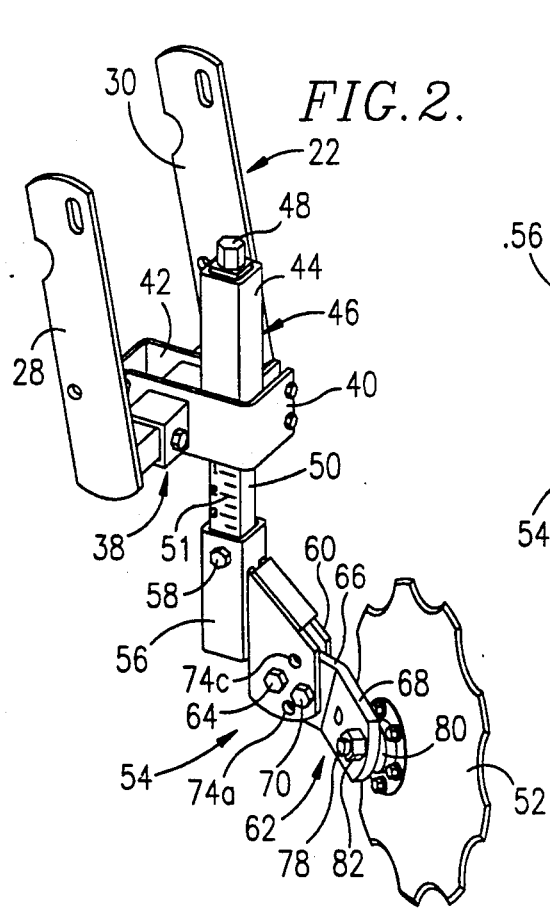
FIG. 2 is a right front perspective view of the ridge preparation tol of FIG. 1.

In accordance with the present invention, a ridge preparation tool denoted broadly by the numeral 20 is attached to the planter 10 ahead of the disc opener 12 for skimming off the crest of the ridge in preparation for the trench forming action of the opener disc 12. As illustrated primarily in FIGS. 1 and 2, the tool 20 includes as a main supporting component thereof a platform or generally U-shaped bracket 22 which is fixedly secured to the upper and lower flotation links 24 and 26 associated with the planter 10. The bracket 22 comprises a pair of opposite, laterally spaced, generally upright side bars 28 and 30 which are fixedly secured to respective sets of the upper and lower links 24,26 by bolts 32 and 34 as illustrated in FIG. 1. It is to be understood that although only a single set of the links 24,26 is illustrated in FIG. 1, each planter unit 10 along the transverse tool beam 36 is provided with a pair of such sets so that the two side bars 28, 30 are positioned in embracing relationship with the two sets of links 24,26 on the outside surfaces thereof.

The transverse bight of each bracket 22 takes the form of a holder assembly 38 having a pair of generally Z-shaped mounting plates 40 and 42 that are configured to clamp and securely mount in place the upright, rectangular housing 44 of a vertical adjustment unit broadly denoted by the numeral 46. Although a variety of different types of vertical adjustment units would be suitable for use in connection with the present invention, in the illustrated embodiment the adjustment unit 46 takes the form of the VARI-JUST screw assembly unit comercially available from the assignee of the present invention.

Suffice it to point out that the adjustment unit 46 includes a long upright screw (not shown) which is contained within the housing 44 and which has a head 48 at its uppermost end on the outside of the housing 44 to provide operating access to the screw. Through a suitable threaded connection not illustrated the adjustment screw is coupled with an upright stem 50 which is telescopically received within the housing 44 so as to be drawn up into the latter or lowered down out of the same depending upon the rotative position of the internal screw. Indicia 51 may be provided on the exterior of the stem 50 to provide an indication of the relative vertical position of the stem 50.

The tool 20 additionally includes a rotary skimming disc 52 and a side throw adjustment assembly 54 which couples the disc 52 with the vertical adjustment unit 46. In more detail, the adjustment assembly 54 includes a relatively short, upright square tube 56 which is slipped onto the lower end of the stem 50 and is secured thereto by a cross bolt 58. A pair of side-by-side mounting plates 60 are welded to the front face of the square tube 56 and project forwardly therefrom to define a receiving space therebetween. Within such space, the inner end of a bent mounting arm 62 is received, pivoted to the plates 60 by a pivot bolt 64 so that the arm 62 is adapted for vertical swinging movement about the transverse, horizontal axis presented by the bolt 64.

The bent arm 62 is constructed from initially flat plate material so that the inner end portion thereof fits neatly within the relatively narrow space between the two mounting plates 60. As a result of the dogleg bend in the arm 62, the arm 62 presents an inner section 66 sandwiched between the two plates 60, and an outer section 68 which is turned outwardly away from the plane of the inner section 66.

Figure 3:
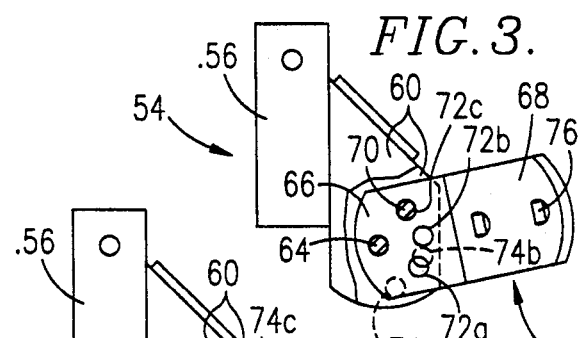
FIG. 3, 4, and 5 are fragmentary side elevational views of the adjustment assembly of the tool showing the three different positions of adjustment of the mounting arm.
Figure 4:
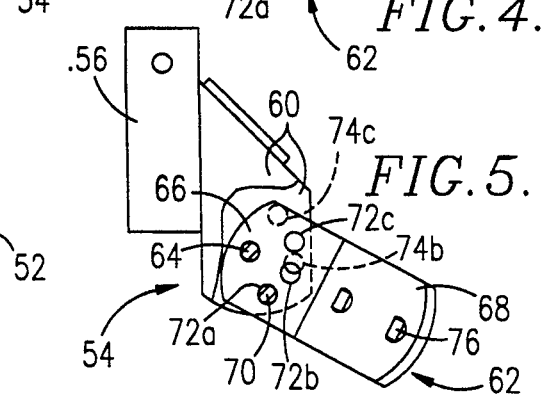
Figure 5:
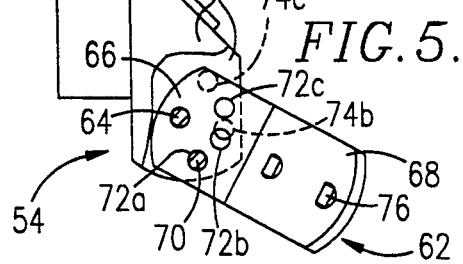

In order to hold the arm 62 in a selected vertical position about the pivot 64, the arm 62 is provided with releasable retaining means in the nature of a series of matchable holes in the arm 62 and the plates 60, and a cross bolt denoted by the numeral 70. As shown in FIGS. 3, 4, and 5, the inner section 66 of the arm 62 has three holes 72a, 72b, and 72c therein which are all disposed at the same radial distance from the pivot bolt 64 and are arranged in an arc at equally spaced circumferentially disposed locations.

Correspondingly, the mounting plates 60 are provided with holes 74a, 74b, and 74c which are disposed on an arc having its center at the pivot bolt 64, like the holes 72a, b, and c.

The radius of the arc for the holes 74a, b, and c is the same as that for holes 72a, b and c, but the holes 72a, b, and c are spaced slightly further apart than the holes 74a, b, and c. Consequently, the holes 72a, b, and c do not all line up simultaneously with their corresponding holes 74a, b, and c. However, as noted particularly in FIGS. 3, 4, and 5, when the arm 62 is swung to its fully raised position, the upper hole 72c in the arm 62 registers with the hole 74c in the plates 60 so that the cross bolt 70 may be inserted into such aligned holes to releasably retain the arm 62 in the raised position of FIG. 3. Similarly, when the arm 62 is lowered to an intermediate position as in FIG. 4, the hole 72b in the arm 62 aligns with the hole 74b in the plates 60. Thus, the locking bolt 70 may be inserted into such aligned holes and used to hold the arm 62 at the intermediate FIG. 4 position. When the arm 62 is in the lowermost position of FIG. 5, the hole 72a in the arm 62 aligns with the hole 74a in the plates 60, whereby the locking bolt 70 may be inserted within such aligned holes to releasably retain the arm 62 in the lowered position of FIG. 5.

The outer section 68 of the arm 62 has a transverse mounting hole 76 therethrough adjacent its outer end (FIGS. 3, 4, and 5) which receives a stub axle 78 associated with a hub assembly 80 on the back side of the skimming member 52. The stub axle 78 is removably retained by a nut 82 (FIG. 2) threaded onto the stub axle 78. It should be apparent from the drawings that the hub assembly 80 and the stub axle 78 are so designed that the skimming member 52 is journaled for free-wheeling rotation within a plane that is at least substantially parallel to the plane of the outturned section 68 of the arm 62, the member 52 being disposed for rotation on the front face of the arm 62 which normally faces forwardly with respect to the direction of travel of the planter 10.

The skimming member 52 itself may take a variety of different forms. In the illustrated embodiment, the number 52 comprises a fluted, concave-convex disc having a continuous or solid dish-like face presented to the soil and residue materials during use. However, it is within the purview of the present invention to have the member 52 take the form of a non-fluted disc, or even some other rotary member which is not necessarily disc-like but does present an effective, forwardly facing surface for the deflection and discharge of soil and residue. For example, the member might include a multitude of radially extending, spoke like rods or bars that terminate at substantially the same radial distance from the axis of rotation so as to present a generally circular periphery but which fail to present a completely closed face to the soil and residue particles during use.

OPERATION

Figure 16:
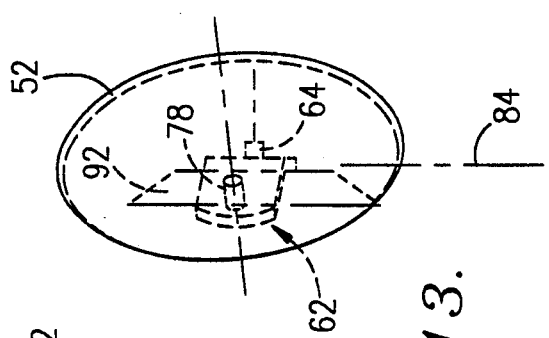
FIG. 16 is a transverse cross-sectional view through the soil illustrating planting ridges and the manner in which the tool of the present invention clears the crown roots and other stubble in preparation for seed planting.
Figure 15:
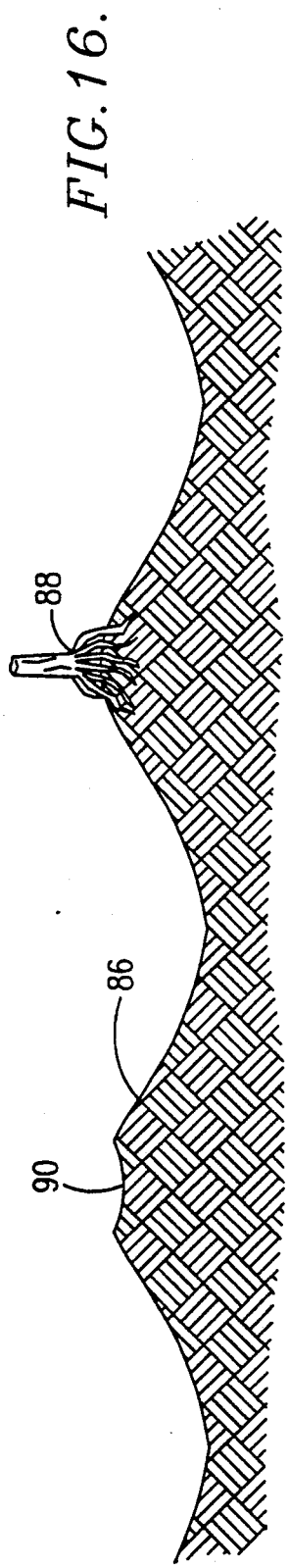
FIG. 15 is a schematic top plan view of the tool illustrating the manner in which it moves along the ridge line during use.

It will be appreciated that the planter 10 has its trench forming discs 12 situated on an imaginary centerline which is denoted by the numeral 84 in FIGS. 7, 9, 11, and 15. It is the intent of the presen invention that the ridge preparation tool 20 be mounted on the planter 10 in such a manner that the skimming disc member 52 is located generally directly on the centerline 84 so that, as the planter 10 moves along a ridge 86 having corn stubble 88 or the like at the crest of the ridge, as illustrated in FIG. 15, the member 52 will skim off such materials and leave a relatively narrow, clean strip of soil 90 immediately behind the disc 52 to be acted upon by the trench forming disc openers 12. FIG. 16 shows a suggestive illustration of a ridge 86 and the cleared strip 90 which is left by the preparation tool 20 of the present invention.

As a consequence of the oblique attitude at which the disc member 52 is held relative to the centerline 84, the soil particles and residue are deflected and thrown laterally as they are encountered by the member 52, creating a protective windrow or line of such materials on one side of the seed row which is deposited by the planter Parenthetically, it should be noted that although FIGS. 2-15 illustrate the disc member 52 arranged to throw the loose materials to the left side of the centerline 84 as viewed from the top, the disc 52 may just as easily be set up to throw the materials in a rightward direction as illustrated in FIG. 1, for example. Such reversal in throw direction may be accomplished by simply removing the arm 62 from the mounting plates 60, inverting it 180°, and then reinserting the arm back into position between the plates 60 as the bolts 64 and 70 are reinserted. This will cause the outer end section 68 of the arm 62 to flare outwardly to the left viewing FIG. 15, instead of to the right as currently shown, such that the materials encountered by the disc 52 will be deflected and thrown to the right side of the ridge 86.

Figures 12, 13, 14:
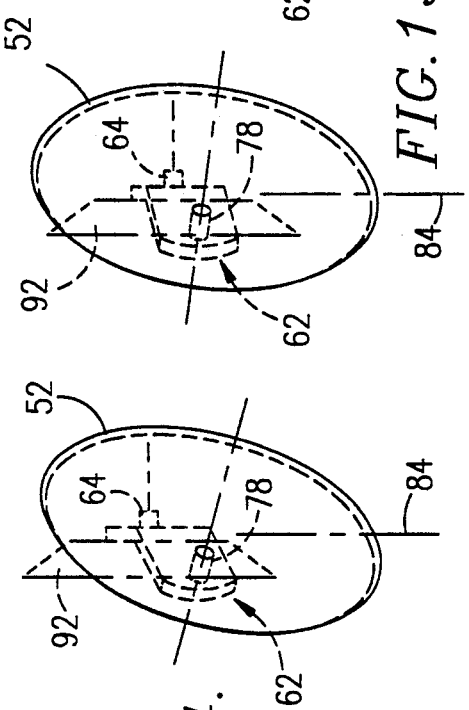
FIGS. 12, 13, and 14 are schematic, front end elevational views of the tool depicting the skimming disc in its three different positions of lean, with FIG. 12 corresponding to the disc in its maximum side throw position of FIGS. 6 and 7, with FIG. 13 corresponding to the moderate throw position of FIGS. 8 and 9, and with FIG. 14 corresponding to the minimum throw position of FIGS. 10 and 11.

FIGS. 6-11 and 12-14 illustrate the three different lean angles which may be selected for the disc 52 in order to adjust the extent of side throw of the skimmed materials. FIGS. 6, 7, and 12 show the disc 52 leaned toward centerline 84 to its maximum extent so as to correspondingly throw the materials the greatest distance. FIGS. 8, 9, and 13 show the disc 52 in an intermediate position in which the disc 52 is substantially fully upright so that the throw distance is less than that achieved in FIGS. 6, 7, and 12 position. At the other extreme is the maximum lean out position of FIGS. 10, 11, and 14 in which the disc 52 is leaned out from the centerline to the maximum extent so that the side throw distance is the smallest of the three positions. It will be appreciated that the extent of lateral lean of the disc 52 is dependent upon the position selected for the mounting arm 62.

As represented schematically in FIGS. 12, 13, and 14, the dogleg bend built into the arm 62 causes the outer section 68 thereof to trace an imaginary conical path 92 when the arm 62 is swung up or down about pivot bolt 64, the base of the cone being spaced outwardly from the centerline, as shown in FIGS. 12-14, and the truncated top of the cone being located next adjacent the centerline, as illustrated in those same figures. As a consequence of having the outer section 68 move along the imaginary conical surface as illustrated in FIGS. 12-14, the stub axle 78 is effectively caused to rock up and back or down and forward, depending upon the direction of movement of the arm 62. Therefore, the disc 52 correspondingly rocks up and back or down and forward to change the side-to-side lean of the disc 52 between the above-described positions.

It will be appreciated that as the arm 62 is adjustably swung upwardly, for example, from the minimum side throw position of FIGS. 10, 11, and 14 to the maximum side throw position of FIGS. 6, 7, and 12, the disc 52 itself is also elevated. However, if the operator desires to maintain the same skimming depth, he need only rotate the head 48 of the adjusting screw in the appropriate direction to correspondingly extend (lower) the stem 50 of the vertical adjustment unit 46 until the bottom edge of the disc 52 is back down at the desired depth. In that manner, even though the side throw distance will have been changed, the operator can be assured that the skimming depth will not be.

Accordingly, it should be apparent that the present invention provides a means of adjusting the side throw of the skimming disc 52 which is uncomplicated, yet highly effective. Furthermore, by utilizing a simple transverse pivot and transverse locking pin concept to accomplish the side throw adjustment, there is provided a very rugged construction which is capable of withstanding the abusive treatment often experienced by tillage equipment of this nature, particularly in no-till and ridge tilling operations. Still further, the reversibility of the direction of side throw by merely removing and reversing the arm 62 is a significant benefit.

Although preferred forms of the invention have been described above, it is to be recognized that such disclosure is by way of illustration only, and should not be utilized in a limiting sense in interpreting the scope of the present invention. Obvious modifications to the exemplary embodiments, as herein-above set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim;

1. In a ridge preparation tool adapted for attachment to a seed planter having trench-forming structure that defines an imaginary, fore-and-aft centerline, the improvement comprising:

a rotary, free-wheeling, at least generally circular soil-engaging member;

a stationary mounting bracket for supporting the member generally on said centerline and in leading relationship with the trench-forming structrue when the bracket is attached to the planter, whereby the member may be used to skim off the crest of a soil ridge in advance of the planter and deposit the skimmed off materials to one side of the ridge as the planter travels along the ridge during planting operations; and adjustment apparatus couplling said member with the bracket in oblique relation with the centerline and in a manner to permit selective adjustment of the member relative to the bracket as to depth of soil penetration by the member and as to the extent of side throw of the skimmed materials by the member, said adjustment apparatus including an upright stem movably supported by said bracket of adjusstment to any selected one of a number of vertically disposed positions, said adjustment apparatus further including an assembly having a component that rotatably supports said member at said oblique angle and is adjustably movable in a direction to maintain the oblique angle of the member at least substantially constant while selectively changing the angle of lean in or lean out of the member generally toward and away from the centerline, whereby to adjust the side throw.

said component being adjustably swingable in an and down motion about a substantially horizontal axis which is substantially normal to the path of travel of the planter, said assembly further including means for releasably retaining the component in a selected vertical position within its range of up and down motion, said component comprising a bent arm having apair of angularly offset, integrally connected sections, an inner one of said sections extending parallel to said centerline and having pivot means associated therewith for permitting the up and down motion of the arm, an outer one of said sections being angled outwardly away from the centerline and having stub axle means associated therewith for rotatably supporting the member, said arm being formed from an initially flat plate such that each of said sections of the arm is of generally planar configuration, said outwardly angled sectin of the arm lying in a plane which is substantially parallel at all times to the plane of rotation of the member, said assembly further including a pair of stationary, normally fore-and-aft extending mounting plates beween which said inner section is contiend during said vertical pivoting motion of the arm, axis releasable retaining means comprising a series of vertically sapced holes in said muonting plates, hole maenas in said inner section of the arm which can be aligned with any selected one oftheholes in said mounting plates by appropriate positioning of the arm, and a transverse pin removably insertable into the aligned hole and hole means.

2. In a ridge preparation tool adpated for attachment to a seed planter having trench-forming structure that defines an imaginary, fore-and-aft centerline, the improvement compirsing:

a rotary, free-wheeling, at least generally circular sol-engaigng member;

a stationary mounting bracket for supporting the member generally on said centerline and inleading relationship with the trench-forming structure when the bracket is attached to the planter, whereby the member may be used to skim off the crest ofa soil ridge in advance of the planter and deposit the skimmed off materials tone side of the ridge as the planter travels along the ridge during planting operations; and adjustment apparatus coupling said member with the bracket in oblique relation with the centerline and in amanner to permit selective adjustment of the member relative to the bracket as to depth of soil penetration by the member and so t the extent of side throw of the skimmed materials by the member, said apparatus including a bent arm having a pair of angularly offset, intgrally connected sections, an inner one of said sections extending parallel to said centerline rnad havin gpivot means associated therewith for permitting up and down swinging motion of the arm about a substantially horizontal axis which is substantially nrmal to the path of travel of the planter, said apparatus further including means for releasably retaining the arm in a selected vertical position within its range of up and down motion, an outer one of said sections being angled outwardly away from the centerline and having stub axle mans associated therewith for rotatably supporting the member, said arm being formed from an initially flat plate such that each of said sections of the arm is of generally planar configuration, said outwardly angled section of the arm lying in a plane which is substantially parallel at all times to the plane of rotation of the member, said apparatus further including a pair of stationary, normally fore-and-aft extending mounting plates between which said inner section is contained during said vertical pivoting motion of the arm, said releasable retaining means comprising a series of vertically spaced holes in said mounting plates, hole means in said inner section of the arm which can be aligned with any selected one of the holes in said mounting plates by appropriate positioning of the arm, and a transverse pin removably insertable into the aligned hole and hole means.

3. For use in combination with a vertically adjustable uspport on a seed planter in advance of trench-forming structure that dfines an imaginary, fore-and-aft centerline of the planter, a ridge preparation tool for skimming off the crest of a soil ridge ahead of the planter and depositing the skimmed off materials to one side of the ridge as the planter travels along the ridge during planting operations, said tool comprising:

a rotary, free-wheeling, at least generally circular soil-engaging member;

an adjustment assembly coupled with the member for permitting selective adjustment of the member as to the extent of side throw of the skimmed materials by the member while the member is disposed in oblique relation to the centerline; and means for detachably securing said assembly to said support, said assembly including a component that rotatably supports said member at asid oblique angle and is adjustably movable in a direction to maintain the oblique angle at least substantially constant while changing the angle at which the member leans generally toward or away from the centerline, said component being adjustably swingable in an up and down motion about a substantially horizontal axis which is substantially normal to the path of travel of the planter, said assembly further including means for releasably retaining the component in a selected vertical position within its range of up and down motion, said component comprising a bent arm having a pair of angularly offset, integrally connected sections, an inner one of said sections extending parallel to said centerline and having pivot means associated therewith for permitting the up and down motion of the arm, an outer one of said sections being angled outwadly away from the centrlne and having stub axle means associated therewith for rotatably supporting the member, said arm being formed from an initially flat plate such that each of said sections of the arm is of generally planar configuration, siad outwardly angled section of the arm lying in aplane which is substantially parallel at all times to the plane of rotation of the member, said assembly further including a pair of stationary, normally fore-and-aft extending mounting plates between which said inner sectino is contained during said vertical pivoting motion of the arm, said releasable retaining means comprising a series of vertically spaced holes in said mounting plates, hole means in said inner section of the arm which can be aligned with any selected one of the holes in said mounting plates by appropriate positioning of the arm, and a transverse pin removably insertable into the aligned hole and hole means.

4. For use in combination with a vertically adjustable support on a seed planter in advance of trench-forming structure that defines an imaginary, for-and-aft centerline of the planter, a ridge preparation tool for skimming off the crest of a soil ridge ahead of the planter and depositings the skimmed off mateials to one side of the ridge as the planter trabvels along the ridge during planting operations, said tool comprising:

a rotary, free-wheeling, at least generally circular soil-engaging member;

an adjustment assembly coupled with the member for permitting selective adjustment of the member as to the extent of side throw of the skimmed materials by the member while the member is disposed in oblique relation to the centerline; and means for detachably securing said assembly to said support said assembly including bent arm ahving apiar of angularly offset, integrally connected sections, an inner one of said sections extending parallel to said centerline and having pivot means associated therewith for permitting swingable, up and down motion of the arm about a substantially horizontal axis which is substantially normal to the path of travel of the planter, said assembly further including means for releasably retaining the arm in a selected vertical position within its range of up and down motion, an outer one of said sections being angled outwardly away from the centerline and having stub axle means associated therewith for rotatably supporting the member, said arm being formed from an initially flat plate such that each of said sections of the arm is of generally panar configuration, said outwardly angled section of the arm lying in a plane which is substantially parallel at all times to the plane of rotation of the member, said assembly further including a pair of stationary, normally fore-and-aft extending mounting plates between which said inner section is contained during said vertical pivotal motion of the arm, said releasable retaining means comprising a series of vertically spaced holes in said mounting plates, hole means in said inner section of the arm which can be aligned with any selected one of the holes in said mounting plates by appropriate positioning of the arm, and a transverse pin removably insertable into the aligned hole and hole means.

5. In combination with a seed planter having trench-forming structure that defines an imaginary, fore-and-aft extending centerline, a ridge preparation tool comprising:

a rotary, free-wheeling, at least generally circular soil-engaging member;

a stationary mounting bracket supporting the member genrally on said centerline and in leading relationship with the trench-forming struture, whereby the member may be used to skim off the crest of asoil ridge in advance of the planter and deposit the skimmed off maerials to noe side of the ridge as the planter travels along the ridge during planting operations; and adjustment apparatus coupling said member with the bracket in oblique relation with the centerline and in a manner to permit selective adjustment of the member relative to the bracket as to depth of soil penetration by the member and as to the extent of side throw of the skimmed materials by the member, said adjustment apparatus including an upright stem movably supported by said bracket for adjustment to any selected one of a number of vertically disposed positions, said adjustment apparatus further including an assembly having a component that rotatably supports said member at said oblique angle and is adjustably movable in a direction to maintain the oblique angle of the member at least substantially constant while selectively changing the angle of leam in or lean out of the member generally toward and away from the centerline, whereby to adjust the side throw, said component being adjustably swingable in an up and down motion about a substantially horizontal axis which is substantially normal to the path of travel of the planter, said assembly further including means for releasably retaining the component in a selected vertical position within its range of up and down motion, said component comprising a bent arm having a pair of angularly offet, integrally connected sections, an inner one of said sections extending parallel to said centerline and having pivot means associated therewith for permitting the up and down motion of the arm, an outer one of said sections being angled outwardly away from the centerline and having stub axle means associated therewith for rotatably supporting the member, said arm being formed from an initially flat plate such that each of said sections of the arm is of generally planar configuration, said outwardly angled section of the arm lying in a plane which is substantially parallel at all times to the plane of rotation of the member, said assembly further including a pair of stationary, normally fore-and-aft extending mounting plates between which said inner section is contained during said vertical pivoting motion of the arm, said releasable retaining means comprising a series of vertically spaced holes in said mounting plates, hole means in said inner section of the arm which can be aligned with a selected one of the holes in said mounting plates by appropriate positioning of the arm, and a transverse pin removably insertable into the aligned hole and hole means.

6. In combination with a seed planter having trench-forming structure that defines an imaginary, fore-and-aft extending centerline, a ridge preparation tool comprising:

a rotary free-wheeling, at least generally circlar soil-engaging member;

a stationary mounting bracket supporting the member generally on said centerline and in leading relationship with the trench-forming structure, whereby the member may be used to skim off the crest of a soil ridge in advance of the planter and deposit the skimmed off materials to one side of the ridge as the plater travels along the ridge during planting operations; and adjustment apparatus coupling said member with the bracket in oblique relation with the centeline and in a manner to permit selective adjustment of the member relative to the bracket as to depth of soil penetration by the member and as to the extent of side thrwo of the skimmed materials by the member, said apparatus including a bent arm hving apair of angularly offset, intgerally connected sections, an inner one of said sections extenng parallel to said centerline and having pivot means associated therewith for permitting up and down swinging motion of the arm about a substantially axis which is substantially normal to the path of travel of the planter, siad apparatus further ncuding means for releasably retaining the arm in a selected vertical position within its range of up and down motion, an outer one of said sections being angled outwardly away from the centerline and having stub axle means associated therewith for rotatably supporting the member, said arm being formed from an initially flat plate such that each of said setions of the arm is of generally planar configuration, said outwardly angled section of the arm lying in a plane which is substantially parallel at all times to the plane of rotation of the member, said apparatus further including a pair of stationary, normally fore-and-aft extending mounting plates between which said inner section is contained during said vertical pivoting motion of the arm, said releasable retaining means comprising a series of vertically spaced holes in said mounting plates, hole means in said inner section of the arm which can be aligned with any selected one of the holes in said mounting plates by appropriate positioning of the arm, and a transverse pin removably insertable into the aligned hole and hole means.

7. In an assemlby for the simultaneous adjustment of height and leans angle of the ridge working tool, the improvement comprising:

a flat, bent arm including a generally planar outer section having means for coupling with said tool, a generally planar inner section integrally connected to said outer section, and an oblique band intermediate said inner and said outer sections;

a base for mounting said arm; and means for coupling said arm with the base in such a manner that said inner section is disposed in an upstanding condition within a normally upright, fore-and-aft plane with respect to the normal path of travel of the tool, said coupling means being disposed to adapt said arm for up and down pivoting movement about a single, transverse axis with said inner section traveling in said upright plane and said outer section traveling along a conical arc oblique to said plane, said base including means for releasably locking said arm in any one of a plurality of preset positions along said conical arc, said positions representing selective height and lean angle adjustments for said tool.

8. The assembly as set forth in claim 7, said coupling means including each of said base and siad inner end having structure defining respective mutually aligned pivot apertures therethrough, and a stub axle having a longitudinal axis in a generally horizontal orientation passing through said pivot apertures.

9. The assembly as set forth in claim 7, said locking means incuding said inner end having structure definnig an arm-locking aperture, said base having structure defining a plurality of base-locking apertures therethrough positioned for mutual alignment with said arm-locking apertures, and a releasable locking pin inserted through an aligned set of said arm-locking and said base-locking apertures.

10. The assembly as set forth in claim 7, said base being a steel plate.

11. The assembly as set forth in claim 7, including said arm formed from a flat plate having said inner and outer ends integrally connected at an oblique bend.

* * * * *